United States Patent [19]
McWhorter

[11] Patent Number: 5,191,858
[45] Date of Patent: Mar. 9, 1993

[54] DUAL CYCLE ENGINE

[76] Inventor: Edward M. McWhorter, 6931 Greenbrook Cir., Citrus Heights, Calif. 95621

[21] Appl. No.: 916,394

[22] Filed: Jul. 20, 1992

[51] Int. Cl.$^5$ ............................................. F02B 35/10
[52] U.S. Cl. .................................... 123/21; 123/65 A; 123/315
[58] Field of Search ...................... 123/21, 65 R, 65 A, 123/65 VB, 658, 568, 433, 315, 65 E

[56] References Cited

U.S. PATENT DOCUMENTS

| | | | |
|---|---|---|---|
| 2,131,616 | 9/1938 | Christenson | 123/21 |
| 3,038,455 | 6/1962 | Dobrosavljeric | 123/79 R |
| 4,108,119 | 8/1978 | McWhorter | 123/315 |
| 4,125,105 | 11/1978 | May | 123/658 |
| 4,248,199 | 2/1981 | McWhorter | 123/315 |
| 4,312,313 | 1/1982 | McWhorter | 123/315 |
| 4,660,513 | 4/1987 | Figliuzzi | 123/65 A |
| 5,113,805 | 5/1992 | Kawamura | 123/21 |
| 5,134,849 | 8/1992 | McWhorter | 60/304 |
| 5,154,141 | 10/1992 | McWhorter | 123/21 |

FOREIGN PATENT DOCUMENTS 1102179 10/1955 France ............................ 123/21

Primary Examiner—David A. Okonsky

[57] ABSTRACT

The invention relates to new and useful improvements in dual-cycle engine design and construction. The invention enhances the mechanical ability of such engines to automatically match the engine cycle with the load conditions while the system is in operation in a manner which significantly reduces the specific fuel consumption. Using the standard L-head engine configuration, the upper cylinder manifolding and the lower cylinder manifolding are combined as single flow channels reducing the number of components required to sequence flow to and from the engine. Combining the upper and lower cylinder manifold circuits standardizes the operating pressures in each system improving exhaust gas ejector efficiencies, facilitating engine control, and simplifying the application of pressure boosting in the air induction circuit. These improvements reduce the design complexity and simplify the automatic transition from 4-stroke to 2-stroke operation. Other benefits of the invention are the reduction of manufacturing costs, decreased engine weight and smaller system envelope.

7 Claims, 2 Drawing Sheets

DUAL CYCLE ENGINE

CROSS REFERENCES

The invention is similar to my U.S. Pat. Nos. 4,180,119, 4,248,199, 4,312,313, 5,134,849 and 5,154,141.

BACKGROUND OF THE INVENTION

1. Field of the Invention

The invention relates to the air induction and exhaust processes of piston driven internal combustion engines which operate singularly as 2-stroke systems or as 4-stroke systems and to dual-cycle engines having the capability of alternately operating in either mode.

2. Description of Prior Art

The use of exhaust gas ejector systems in cylinder side-port manifolding circuits of the reciprocating piston engine is taught in the cross-referenced U.S. Pat. Nos. 4108119, 4248199 and 4312313. The use of exhaust gas ejector systems was extended to application in the cylinder head manifolding in cross referenced U.S. Pat. No. 5154141. This latter application provided the necessary mechanical facility for dual-cycle engine operation. The present invention utilizes many of the features of the cross-referenced patents in a unique manner which provides new and useful improvements in the design of the dual-cycle engine.

The invention comprises the induction and exhaust manifolding of a piston driven engine having an L-head valve arrangement. This type of engine configuration was most popular in the so-called flat-heat designs which predominated the automotive engine market until about 1950. Although the present invention is not limited to use of the L-head configuration it does provide the simplest means of combining the upper cylinder head manifolding with the lower cylinder side-port manifolding and thus reduces the number of manufactured components required.

In the design of most standard engine systems two poppet valves are employed at each engine cylinder. In order to increase engine power by increasing the volumetric efficiency of the system, and thus bring about the reduction of engine size, todays high performance engines now employ as many as 4 valves per engine cylinder. In the present invention only one valve is used per engine cylinder thus decreasing the number of manufactured parts required in the valve-train design. The number of valve-train components is further reduced in the present L-head configuration eliminating the need for rocker arms, push rods, overhead lubrication, valve cover and gaskets. This feature of the design reduces the amount of engine noise, and provides a lighter weight engine having a smaller envelope and most important it is less expensive to manufacture.

In the dual-cycle engine design it is desirable to increase the ejector air-chest manifold pressures in order to assure a positive differential pressure across the ejector diffuser in order to maintain a pulsating unidirectional flow through it. This constant flow of air through the diffusers into the exhaust manifold eliminates the need for a waste-gate necessary to prevent over pressurization.

Boost pressure to the air chest is also beneficial to efficient high speed sequencing through the ejector nozzle which must function as a bidirectional flow component. The rapid flow reversal within the ejector nozzle is most efficiently accomplished when air-chest pressures are high.

The preferred method of obtaining boost pressure is by mechanical or electrically driven superchargers.

Because of the high exhaust system back-pressures associated with the operation of turbochargers this method of obtaining boost pressure is less effective in dual-cycle engine design. However in some configurations of the cross-referenced patents good performance has been achieved using the upper exhaust gas manifold to drive the turbine and the blower to pressurize the lower cylinder side-port ejector air-chest.

When boost pressure is not applied, flow within the air-chest depends principally on the efficiency of the momentum exchange between the exhaust gas stream from the ejector nozzle and the air at the inlet of the ejector diffuser. Additional flow is obtained by the negative pressure phase within the engine cylinder during the exhaust blowdown.

The high ratio of surface to flow area within the annular opening of the poppet valve results in higher frictional losses than through other types of restrictive openings having the same flow area. In dual-cycle engine design this situation can be further aggravated by the additional restriction of flow in the ejector nozzle mounted in the cavity directly below the valve. Because only one valve is operating within the cylinder clearance volume valve over-lap is not a problem. Therefore the poppet valve is raised higher off its seat than would be practical in the design of engines having a plurality of such valves in each cylinder and thus the general problem of restrictive flow losses in this area is alleviated. Flow restriction at the ejector nozzle inlet in the cavity below the poppet valve must be designed sufficiently high in order to create a critical pressure ratio across the ejector nozzle promoting sonic flow at the nozzle inlet which is slightly accelerated in the nozzles conical section thus increasing the momentum exchange of the exhaust gas stream with the air stream in the air-chest.

The continuous flow of the supercharged air in the air-chest through the ejector diffuser helps to center the flow of the impacting exhaust stream in front of the diffuser inlet and facilitate its passage through the diffuser into the exhaust gas manifold Unlike the other types of poppet valve manifolding it is desirable to keep the volume of the cavity below the valve as small as possible which hardens the system by decreasing the volume available for compressibility and thus quickens the flow reversal in the nozzle during the subsequent induction reducing the cycle lag permitting the system to function more effectively while operating in the 2-stroke mode at higher engine speeds.

Because the inlet and outlet pressures of the upper and lower cylinder ejector diffusers operate at essentially the same pressure in the present invention the control of the engine is simplified over that of previous designs in which the upper and lower manifolds were controlled separately.

SUMMARY OF THE INVENTION

The manifolding of the dual-cycle engine is complex, making the control of the engine difficult and costly. The present invention provides a means of combining the upper cylinder manifolding, which controls the flow to and from the clearance volume, with the lower cylinder manifolding controlling the flow to and from the side-port. The objectives of the design are:

a. To provide a means of changing the mode of engine operation from 4-stroke to 2-stroke, and vice versa, while the engine is running thus permitting the automatic selection of the most efficient mode of operation relative to engine speed or load conditions.

b. To decrease the engine piston pumping losses and to also decrease the thermal load on the upper cylinder components by the early evacuation of a portion of the combustion gas exhaust products through a side-port ejector nozzle.

c. To run the engine at lean fuel to air ratios by using a single poppet valve to control both the exhaust gas flow as well as the reverse flow of induction air into the chamber which cools the valve surfaces. This is accomplished with negligible exhaust gas dilution by the facility of the exhaust gas ejector.

d. To reduce the manufacturing costs and decrease the frictional loads by using fewer parts in the valve trains the invention uses only one poppet valve per cylinder halving the number of valve springs, valve tappets, and cam lobes lowering the torque load on the camshaft.

e. To reduce the size of the engine envelope by using the L-head configuration which further reduces the manufacturing costs by the elimination of rocker arms and bearings, push rods, valve cover and gaskets and the necessity to form overhead lubrication passages.

f. To decrease the engine weight and noise by decreasing the number of moving parts.

All of the foregoing and still further objects and advantages of the unique manner of engine construction constituting this invention will become apparent from the drawings and detailed description provided.

BRIEF DESCRIPTION OF THE DRAWINGS

Drawings of the invention are presented as part of the specification showing the general placement of engine components and in particular the major elements of the combined manifolding which constitute the major unique feature of the engine.

DESCRIPTION OF THE PREFERRED EMBODIMENT

Figure 1:
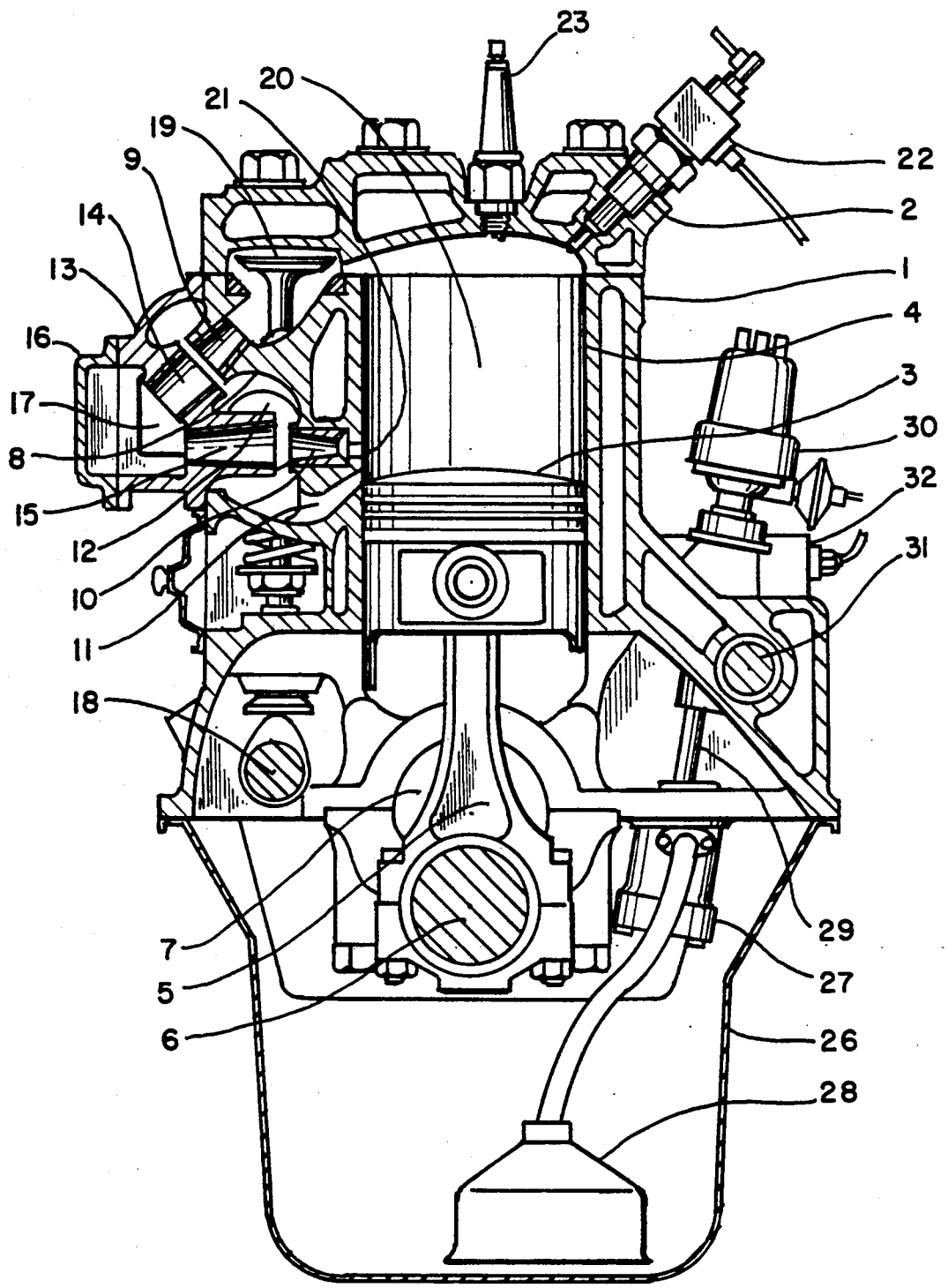
FIG. 1 is a drawing of the engine system shown principally in cross-section cutting through the axial center of the engine cylinder.

Referring now to FIG. 1 of the drawings which is a cross-section of an internal combustion reciprocating piston driven engine having an L-head valve arrangement, said engine comprising block 1, cylinder head 2, piston 3 slidably mounted in cylinder 4, connecting rod 5 pivotally mounted on said piston 3 at one end and rotatively mounted on crankpin 6 at the other end such that the rotation of crankshaft 7 imparts a reciprocating motion to the said piston 3 in said cylinder 4.

Elements within the engine air induction circuits comprise the air-chest manifold 8, upper cylinder ejector nozzle 9, side port ejector nozzle 10, lower side-port 11 and air inlet 12. The unique feature of this configuration is seen in the fact that all of the elements open into a single air chest manifold which simplifies the design and manufacture and facilitates the application of boost pressure which can be supplied at a single air inlet 12 common to all of the elements within the air-chest manifold 8. Air pressure within the air-chest manifold is fairly constant and uniform at each of the said induction circuit elements which simplifies the engine balance and control. The system air induction circuits discussed above are shown as integrally cast as a part of engine block 1 which is the preferred method, however the same system may be fabricated separately and mounted on block 1. Upper cylinder ejector nozzle 9 and side-port ejector nozzle 10 are shown as press-fit inserts which is the preferred method of forming these surfaces. However these surfaces may be machined directly into the casting wall omitting the use of inserts and function equally well.

Figure 2:
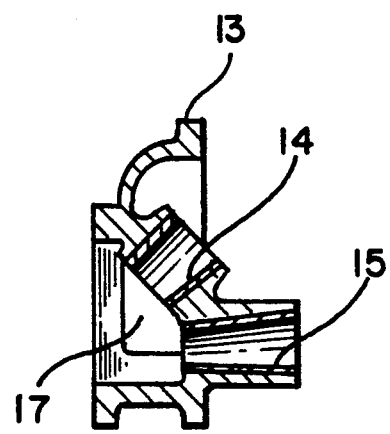
FIG. 2 is a drawing of the exhaust manifold and ejector diffusers shown in cross-section.

Elements within the engine combustion gas exhaust circuits comprise the exhaust gas manifold 13, upper cylinder diffuser 14, side-port diffuser 15, exhaust gas manifold cover 16 and exhaust outlet 17. The unique features of the configuration are again seen in the simplicity of the design which facilitates its manufacture. This simplicity is seen in the cross-section of the exhaust gas manifold 13 casting shown in FIG. 2. In FIG. 2 the upper manifold diffuser 14 and the side-port diffuser 15 are shown as being formed by conical inserts press fit into bored holes in the manifold casting. This is done to provide uniformity in diffuser lengths and inlet and outlet diameters which are difficult to obtain in the casting surfaces without spot finishing which increase the component cost. Where casting surface finish is of high quality inserts are not required.

Another unique feature achieved by combining the upper cylinder exhaust and induction circuits with the lower side-port exhaust and induction circuits is seen in the smaller engine envelope and in the reduced engine weight.

Returning to FIG. 1. When camshaft 18 is made to rotate at the same frequency as crankshaft 7 by the use of a 1 to 1 ratio gearing the system is capable of 2-stroke operation. By the use of electronic timing of the sequence of the fuel injection to injector 22 and high tension voltage to spark plug 23 the system is capable of operating in either the 2-stroke or 4-stroke modes as a dual-cycle engine as taught in the cross-referenced U.S. Pat. No. 5154141.

In FIG. 1 the piston 3 is shown in the bottom-dead-center position of crankshaft 7 rotation and poppet valve 19 is shown in the open position. When piston 3 and poppet valve 19 are in these positions air is taken into cylinder volume 20 through lower side-port 11, side-port 21 and open poppet valve 19 during the negative pressure phase of the exhaust blowdown. When the piston 3 starts its upward rise it closes air inlet 12 and side-port 21 and poppet valve 19 also closes such that the inducted air is compressed in the clearance volume and fuel is injected into the compressed volume through fuel injector 22 and ignited by high tension voltage supplied to spark plug 23 driving the piston 3 downward to the bottom-dead-center position of crankshaft 7 rotation completing the cycle. The system can also be operated as a diesel engine by increasing the compression such that the injected fuel is ignited by the heat of compression. In this latter instance the spark plug 23 and ignition spark distributor 30 are not required.

When camshaft 18 is made to rotate at half the cycle frequency of crankshaft 7 by the use of 2 to 1 gear ratio only 4 stroke operation is intended. The volumetric efficiency of this mode of operation is improved by the additional flow of air through the side-port 21 and lower side port 11. Early evacuation of exhaust gas through side-port 21 and lower side port 11 decrease the system pumping losses and reduce the heat load on the poppet valve 19 allowing the use of higher energy fuel or operation at leaner air to fuel mixtures. Because of the decreased heat load on poppet valve 19 and the reverse flow of coolant air across its surfaces, poppet valve 19 does not require special coolant facilities such as found in the sodium cooled valves and it may be machined from a solid upset forging.

Figure 3:
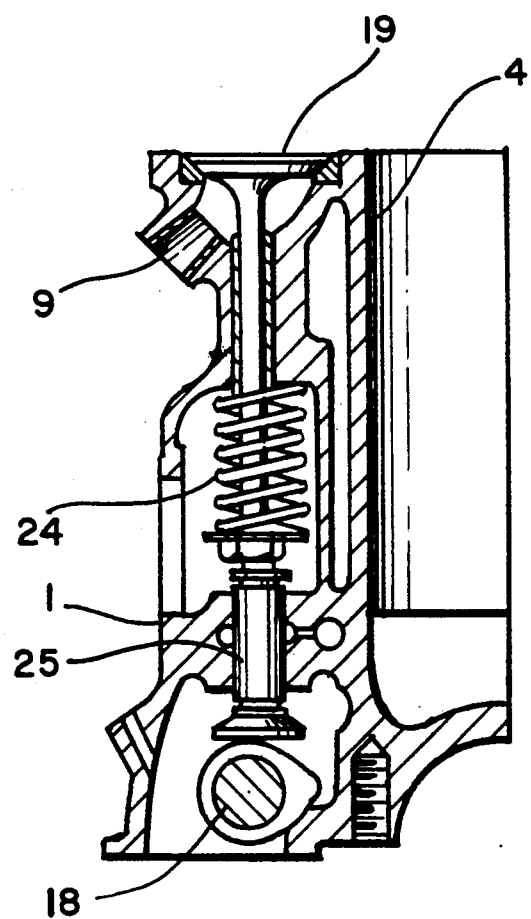
FIG. 3 is a drawing of half of the engine block shown principally in cross-section cutting through the axial center of the valve port.

Poppet valve 19 is offset from the center of cylinder 4 in order to allow the side-port ejector nozzle 10 and side-port diffuser 15 to be centered on cylinder 4. Poppet valve 19 and the valve train parts comprising the valve spring 24 and valve tappet 25 are conveniently placed between engine cylinders as shown in FIG. 3 and thus do not interfere with the combined manifold circuits.

Other features of the engine system shown in FIG. 1 which are uniquely different from that found in the design of most small 2-stroke engines is the use of oil reservoir formed by oil pan 26. Most small 2-stroke engines operate as so-called dry-sump systems and are lubricated by mixing oil with the fuel. The combustion products of such systems are often high in unburned hydrocarbons and other heavy particulate matter resulting from incomplete combustion of the lubricating additive. Dry-sump system must also use ball or roller bearings at the crankshaft journals and at connecting rod crankpin journals. Ball bearings and roller bearings are costly and do not stand up under hard pounding as do the more durable and less expensive sleeve bearings as employed in the present invention.

In FIG. 1 it can be seen that in the combined manifolding sufficient engine envelope is available to accommodate the air-chest manifold 8, exhaust gas manifold 13, poppet valve 19 and camshaft 18 on one side of the engine while all of the engine utility equipment may be operated on the other side of the engine. The engine utility equipment comprises oil pump 27, ignition spark distributor 30 and fuel injection pump 32. Oil pump 27 which draws oil from oil pan 26 through strainer 28 for delivery to the oil galleries is driven by shaft 29 which also drives ignition spark distributor 30. Shaft 29 is driven by utility shaft 31 through right angular worm gearing which is not shown in FIG. 1. The fuel injection pump 32, which supplies fuel to injector 22, is also driven by utility shaft 31. Utility shaft 31 is rotated through gearing driven by rotation of crankshaft 7.

Those skilled in the art will recognize the fact that the engine cycle described in the present invention can be made to run on the Diesel cycle by the removal of spark plug 23 which will permit the clearance volume to be further reduced to achieve a higher compression ratio required to promote ignition. This modification also eliminates the need for ignition spark distributor 30.

What is claimed is:

1. In a reciprocating piston driven internal combustion engine, an air-chest manifold, said air-chest manifold comprising an upper cylinder ejector nozzle fixedly attached to said air-chest manifold and in communication with an upper cylinder port, a side-port ejector nozzle fixedly attached to said air-chest manifold in line with and in communication with a cylinder wall side-port, a lower cylinder wall side-port, an air inlet to said air-chest manifold, an exhaust gas manifold, said exhaust gas manifold comprising an upper cylinder diffuser, said upper cylinder diffuser fixedly mounted in said exhaust gas manifold and aligned with said upper cylinder ejector nozzle, a side-port diffuser fixedly mounted in said exhaust gas manifold and aligned with said side-port ejector nozzle, an exhaust outlet in said exhaust gas manifold.

2. The engine of claim 1 in which the said air-chest manifold is a part of the said engine block casting.

3. The engine of claim 1 in which the said air-chest manifold is a separate component and is fixedly mounted on said engine block.

4. The engine of claim 1 in which the internal combustion is initiated by a high tension voltage applied to a spark plug.

5. The engine of claim 1 in which the internal combustion is initiated by the heat of compression within the clearance volume.

6. The engine of claim 1 in which the said upper cylinder ejector nozzle and the said side-port ejector nozzle are formed as press fit inserts.

7. The engine of claim 1 in which the said upper cylinder diffuser and the said side-port diffuser are formed as press fit inserts.

* * * * *